3,066,076
SOLUBLE HEPARIN PRODUCT AND PROCESS FOR PREPARING SAME
Denis Monnier, Geneva, Switzerland, assignor to "Fo-We" Forschungs- und Verwertungs-Anstalt, Vaduz, Liechtenstein, a body corporate of the principality of Liechtenstein
No Drawing. Filed Dec. 4, 1959, Ser. No. 857,273
Claims priority, application Switzerland Dec. 15, 1958
5 Claims. (Cl. 167—74)

It is known that polysaccharides are characterized by high molecular weight, and can be split by hydrolysis into many molecules of monoses, especially pentoses, hexoses, glucosamine, uronic acids, etc. They are very widely distributed in nature and can be subdivided into simple polysaccharides such as starch, cellulose, glycogene, inulin and complex polysaccharides such as pectin, chitin, alginic acids, chondroitin sulphate, hyaluronic acid, and heparin.

I have found that polysaccharides, and particularly mucopolysaccharides such as heparin have the property of combining with alkali metal iodides, of which the cations are very strongly bound to the polysaccharides. This property is especially a feature of the behaviour of heparin; it can accordingly be advantageously used to prepare compositions which combine the therapeutic properties of heparin, and the properties of alkali metal iodides.

Based on the above considerations, the present invention has for its object a process of preparing therapeutically active products, namely, alkali metal iodide (sodium iodide or potassium iodide) chemically bound to heparin.

This process is characterized in that heparin is admixed in aqueous solution with sodium iodide or potassium iodide to produce a water soluble chemcal combination of heparin and the iodide. In general, although not necessarily, the pH of the reaction medium is kept above 4, for example near neutrality.

The reaction can be carried out to advantage at a temperature of between 70° C. and 135° C., and particularly near 105° C., in an autoclave.

Heparin is a mucopolysaccharide of which each monomer unit has 7 acidic hydrogen atoms, the majority of which correspond to strong acids. As heparin is water soluble, it is very strongly dissociated in that state and gives a very large and very electronegative polymer ion which gives very distinctive properties to these solutions of the polysaccharide.

For example, this strong electronegativity of the polymer ion gives rise to a very strong electrostatic attraction between it and metallic cations arising from salts such as NaI or KI in solution. Actual linkages are thus established in the solution between heparin and these salts.

The polymer, being dissolved, acts as an ion exchange resin, with the same properties with respect to the ions, and identical catalytic effects. Moreover, because this polymer is water-soluble it is very active, and possesses new properties some of which are of therapeutic interest.

Experience shows that the iodide anion also undergoes an attraction and comes into contact with the heparin to which it is bound by means of the cation.

The nature of the chemical combination of the products obtained by the process of the invention has been shown by various experiments based on dialysis, precipitation, viscosity, electrophoresis and allied phenomena.

As already stated, the said products combine therapeutic properties of the heparin and of the alkali metal iodides of which they are composed.

The combination heparin-alkali metal iodide, for example, in the form of sodium heparinate gives a very important advantage from the psysiopathological point of view in that it combines an action on the blood and a vascular action, in the two syndromes which can be dealt with by heparin therapy, namely coronary thrombosis and arteriosclerosis.

It is known that the effects of coronary thrombosis and of arteriosclerosis arise jointly from factors concerning the blood itself and from vascular factors.

For factors arising from the blood itself it is a question of hypercoagulability (coronary thrombosis) and disturbances of the lipid-protein equilibrium (arteriosclerosis).

With respect to the vascular factors, these are the lesions of the endothelium which in coronary thrombosis favour the formation of the clot as a consequence of the creation of a raw zone, whereat the blood corpuscles agglutinate. In arteriosclerosis, the lesions of the intima precede the infiltration of the lipid into the vascular wall.

Now, as a therapeutic agent, heparin only exerts its effect on the blood factors of coronary thrombosis and arteriosclerosis and the iodides are endowed with specific vascular properties.

Moreover, in arteriosclerosis, iodides act synergistically on heparin, when they promote lipid catabolism, especially that of cholesterol.

It can therefore be seen that the heparin-alkali metal iodide combination gives certain therapeutic advantages over heparin alone, which are based on pathogenic and physiopathological properties whose importance has been clearly demonstrated.

These advantages have been supported elsewhere by pharmacological research and clinical experiment. The heparin-alkali metal oxide combination is not toxic and can be shown to provoke no unfavourable side-reactions, especially when administered in the usual doses. It should also be stressed that it causes no modification of the specific properties of its two constituents. In particular the anticoagulant activity of the heparin thus combined is completely retained, as are its other biological properties.

From the clinical viewpoint, it has been discovered that the heparin-alkali metal iodide combination is of interest owing to its specific vascular properties. As a result of this, this combination marks a new step in heparin therapy and is a valuable weapon in the treatment of coronary thrombosis and arteriosclerosis.

To prepare the heparin-alkali metal iodide product, predetermined quantities of alkali metal iodide are added to a solution of heparin. The reaction proceeds faster at 100° C., and should be carried out in neutral solution. The product obtained is stable and can be kept in ampoules.

The reaction mixture may also be distilled in vacuo to drive off water and obtain a dry product. This is a yellowish crystalline powder and is very stable.

Instead of using the iodide, it is possible to use compounds which give rise to iodides under the conditions of the experiment.

The invention can be further described with reference to the following examples.

*Example I*

20 mg. of the sodium salt of heparin are dissolved in 100 ml. of water and the pH of the solution so obtained adjusted to 7 by adding sodium hydroxide. 40 ml. of a solution of sodium iodide or potassium iodide is then added which contains 10 mg. of iodine in every ml. of solution. The mixture so prepared is brought to 100° C., and held at that temperature for half an hour. The resulting liquid can be used with no further treatment.

Example II

The same aqueous mixture as in Example I, containing the sodium salt of heparin and sodium iodide.

This mixture is evaporated under vacuum (for example in a Craig evaporator) to dryness, a crystalline substance being obtained. This is used for example on injection, in aqueous solution.

Example III 20 parts by weight of crystalline sodium iodide and 100 parts by weight of heparin in a solid state are mixed together. An aqueous solution of this mixture is made, and is heated to 100° C. and kept at this temperature for half an hour; the resulting liquid can be used as such.

Example IV 100 mg. of the sodium salt of heparin are dissolved in 6 ml. of distilled water. To the solution obtained 4 ml. of an aqueous solution containing 20 mg. of sodium iodide is added, and the solution is held at 100° C. for 2 hours. A heparin-sodium iodide solution is obtained.

Example V 200 mg. of the sodium salt of heparin are dissolved in 20 ml. of distilled water and 80 mg. of sodium iodide are added to the solution obtained. The whole is evaporated under vacuum at a temperature of between 30° C. and 40° C. A yellowish white residue is obtained, which is treated with boiling alcohol for three and a half hours in a Soxhlet apparatus to extract the unreacted sodium iodide.

What I claim is:

1. Sodium iodide chemically bound to heparin.
2. Potassium iodide chemically bound to heparin.
3. A process which comprises admixing in aqueous solution at a pH of about 7 and a temperature of about 105° C. in a closed vessel (*a*) heparin with (*b*) sodium iodide, whereby a water-soluble therapeutic containing heparin chemically bound to sodium iodide is formed.
4. A process which comprises admixing in aqueous solution at a pH of about 7 and a temperature of about 105° C. in a closed vessel (*a*) heparin with (*b*) potassium iodide, whereby a water-soluble therapeutic containing heparin chemically bound to potassium iodide is formed.
5. A process which comprises admixing in aqueous solution heparin with a member selected from the group consisting of sodium iodide and potassium iodide, whereby a water soluble therapeutic containing heparin and one of said alkali metal iodides is formed.

References Cited in the file of this patent

UNITED STATES PATENTS

| | | |
|---|---|---|
| 2,797,184 | Coleman | June 25, 1957 |
| 2,811,517 | Novak | Oct. 29, 1957 |

OTHER REFERENCES

Scott: Biochemica and Biophysica Acta, vol. 18, 1955, pages 428–429.